US006598283B2

(12) United States Patent
Rouanet et al.

(10) Patent No.: US 6,598,283 B2
(45) Date of Patent: Jul. 29, 2003

(54) METHOD OF PREPARING AEROGEL-CONTAINING INSULATION ARTICLE

(75) Inventors: Stephane F. Rouanet, Westford, MA (US); David J. Spelman, Arcola, IL (US)

(73) Assignee: Cabot Corporation, Boston, MA (US)

( * ) Notice: Subject to any disclaimer, the term of this patent is extended or adjusted under 35 U.S.C. 154(b) by 17 days.

(21) Appl. No.: 10/036,773

(22) Filed: Dec. 21, 2001

(65) Prior Publication Data

US 2003/0115838 A1 Jun. 26, 2003

(51) Int. Cl.[7] .......................... B21D 39/00; B23P 11/00; B32B 1/04
(52) U.S. Cl. .......................... 29/455.1; 29/428; 428/69
(58) Field of Search ................... 29/455.1, 428, 29/505, 773, 776, 778; 428/68, 69, 76

(56) References Cited

U.S. PATENT DOCUMENTS

| 3,962,014 A | 6/1976 | Hughes et al. |
| 4,159,359 A | 6/1979 | Pelloux-Gervais et al. |
| 4,251,252 A | 2/1981 | Frazier |
| 4,273,161 A | 6/1981 | McLaughlin |
| 4,581,804 A | 4/1986 | McLaughlin |
| RE32,258 E | 10/1986 | Kondo et al. |
| 5,091,233 A | 2/1992 | Kirby et al. |
| 5,252,408 A | 10/1993 | Bridges et al. |
| 5,273,801 A | 12/1993 | Barry et al. |
| 5,376,424 A | 12/1994 | Watanabe |
| 5,500,305 A | 3/1996 | Bridges et al. |
| 5,512,345 A | 4/1996 | Tsutsumi et al. |
| 5,527,411 A | 6/1996 | Jutte |
| 5,928,723 A | 7/1999 | Koehlert et al. |
| 6,132,837 A | 10/2000 | Boes et al. |
| 6,143,400 A | 11/2000 | Schwertfeger et al. |
| 6,148,519 A | 11/2000 | Stenersen et al. |
| 6,156,386 A | 12/2000 | Schwertfeger |
| 2002/0114937 A1 * | 8/2002 | Albert et al. ............ 428/304.4 |

FOREIGN PATENT DOCUMENTS

| JP | 55-150217 A | 11/1980 |
| JP | 02-130111 A | 5/1990 |
| JP | 10-061875 A | 3/1998 |
| JP | 10-146910 A | 6/1998 |
| JP | 10-209040 A | 8/1998 |
| JP | 10-318666 A | 12/1998 |
| JP | 2000-128256 A | 5/2000 |
| JP | 10-335582 A | 6/2000 |

* cited by examiner

Primary Examiner—John C. Hong

(57) ABSTRACT

The inventive method of preparing an insulation article comprises providing a sealed first container comprising aerogel particles under a first air pressure that is less than atmospheric pressure. The unrestrained volume of the aerogel particles at the first air pressure is less than the unrestrained volume of the aerogel particles under a second air pressure that is greater than the first air pressure. The sealed first container then is placed within a second container, and the sealed first container is breached to equalize the air pressure between the first and second containers at the second air pressure and to increase the volume of the aerogel particles, thereby forming the insulation article.

14 Claims, No Drawings

METHOD OF PREPARING AEROGEL-CONTAINING INSULATION ARTICLE

FIELD OF THE INVENTION

This invention pertains to a method of preparing an insulation article.

BACKGROUND OF THE INVENTION

Insulation articles are used in a variety of applications to provide an insulation layer. For example, insulation articles, typically in the form of panels, are used in refrigerators to provide the necessary insulation between the cold interior and the warmer exterior. Insulation articles are formed in many ways, though, typically, insulation articles are formed by filling panels and other cavities with insulating materials, such as insulating fibers and powders. Such a preparation process, however, is often cumbersome and does not result in an insulation article with the most optimum thermal conductivity characteristics.

In particular, the filling of containers with insulation materials typically requires the manual handling of the insulating materials. The drawbacks of handling such insulating materials include potential health hazards and user inconvenience.

The invention provides a method of preparing an insulation article that minimizes the handling of the insulation material and maximizes the thermal conductivity characteristics of the resulting insulation article. These and other advantages of the invention, as well as additional inventive features, will be apparent from the description of the invention provided herein.

BRIEF SUMMARY OF THE INVENTION

The inventive method of preparing an insulation article comprises providing a sealed first container comprising aerogel particles under a first air pressure that is less than atmospheric pressure. The unrestrained volume of the aerogel particles at the first air pressure is less than the unrestrained volume of the aerogel particles under a second air pressure that is greater than the first air pressure. The sealed first container then is placed within a second container, and the sealed first container is breached to equalize the air pressure between the first and second containers at the second air pressure and to increase the volume of the aerogel particles, thereby forming the insulation article.

DETAILED DESCRIPTION OF THE INVENTION

The invention provides a method of preparing an insulation article. The method of preparing the insulation article comprises providing a sealed first container and a second container. The sealed first container comprises aerogel particles under a first air pressure that is less than atmospheric pressure. The unrestrained volume of the aerogel particles at the first air pressure is less than the unrestrained volume of the aerogel particles under a second air pressure that is greater than the first air pressure. The sealed first container then is placed within the second container that is at an air pressure greater than the air pressure present in the sealed first container. Upon breaching the sealed first container, the air pressure between the first and second containers is equalized at the second air pressure. The volume of the aerogel particles accordingly increases to fill the second container, thereby forming the insulation article.

The first and second containers can be any suitable containers. In particular, the first container must be capable of containing aerogel particles under an air pressure that is less than atmospheric pressure. In addition, the first container must be capable of being breached so as to allow the volume of the aerogel particles to expand upon being exposed to the higher, equalized air pressure between the first and second containers. The second container is larger than the first container so that the first container can be placed within the second container. While the second container need not be sealable, the second container desirably is sealable to retain the aerogel particles within the second container upon the breach of the sealed first container and the expansion of the volume of the aerogel particles upon being exposed to the higher, equalized air pressure between the first and second containers. The first and second containers can be formed of any suitable material(s) and can be rigid or flexible. It is particularly desirable that the first container consist essentially of, preferably consist of, a film, e.g., a polyester or shrink-wrap film, that is of a relatively thin gauge so as to be easy to breach by puncture or by exposure to heat. It is similarly desirable that the second container comprise, preferably consist of, a film that is of a relatively thicker gauge or of a material that does not breach upon exposure to the same level of heat as would cause the breach of the first container and desirably is sealed by that same heat.

The aerogel can be any suitable aerogel. A "gel" refers to a coherent, rigid, continuous three-dimensional network of colloidal particles. Gels are produced by the aggregation of colloidal particles (typically under acidic conditions when neutralizing salts are absent) to form a three dimensional gel microstructure. When a gel is dried (i.e., when liquid is removed from the pores) by means in which the coherent gel microstructure is preserved, such as by supercritical drying, a low-density gel or an "aerogel" is formed. A suitable process for the production of an aerogel is described in U.S. Pat. No. 3,122,520. The aerogel preferably is a metal oxide aerogel, particularly a silica aerogel.

Aerogel particles have highly desirable properties such as, for example, optical transparency, extremely low density, and very low thermal conductivity. Accordingly, aerogel particles are advantageously used as an insulating material. The aerogel particles can have any suitable diameter. Preferably, the diameter of substantially all of the aerogel particles is about 0.5 mm or more (e.g., about 1 mm or more). More preferably, the diameter of substantially all of the aerogel particles is about 5 mm or less (e.g., about 0.5 or 1 mm to about 5 mm). The aerogel particles can have any suitable density, preferably about 0.05 $g/cm^3$ to about 0.15 $g/cm^3$. The aerogel particles also can have any suitable surface area, preferably at least about 200 $m^2/g$. The surface area described herein is calculated based on the amount of nitrogen adsorbed at five different relative pressures over the range 0.05 to 0.25 atm according to the Brunauer-Emmett-Teller (BET) model, referenced in Gregg, S. J., and Sing, K. S. W., "Adsorption, Surface Area and Porosity," p. 285, Academic Press, New York (1991).

The aerogel particles in the sealed first container are under a first air pressure that is less than atmospheric pressure, which generally can be regarded as about 100 kPa (but which varies depending on the altitude at which the sealed first container comprising the aerogel particles is prepared). The air pressure in the first container, i.e., the first air pressure, can be obtained in any suitable manner, e.g., by establishing at least a partial vacuum within the first container, which vacuum can be created using conventional equipment. The air pressure within the first container desirably is about 50 kPa or less (e.g.; about 10–50 kPa), preferably about 20 kPa or less (e.g., about 1–20 kPa), and more preferably about 10 kPa or less (e.g., about 1 kPa or less or even about 0.1 kPa or less).

The air pressure in the second container, i.e., the second air pressure, can be obtained in any suitable manner. Desirably, the air pressure in the second container will be atmospheric pressure (e.g., about 100 kPa), although the air pressure in the second container can be different from atmospheric pressure, i.e., lower or higher than atmospheric pressure.

The unrestricted volume of the aerogel particles within the sealed first container at the first air pressure is less than the unrestricted volume of the aerogel particles under a second air pressure that is greater than the first air pressure. The term "unrestrained" is meant to exclude the effect of any restraint by the container, so that the volume of the aerogel particles is considered based on the effect of the air pressure alone. The aerogel particles in the first container typically will have an unrestrained volume that is less than the unrestrained volume at substantially atmospheric pressure, which usually will be the second air pressure to which the aerogel particles are subjected in the final product of the insulation article.

The unrestrained volume of the aerogel particles at the second air pressure can be less than, greater than, or substantially the same as the volume of the second container. In other words, aerogel particles can underfill, overfill, or merely fill the second container. Desirably, the aerogel particles merely fill or overfill the second container, such that the unrestrained volume of the aerogel particles at the second air pressure is substantially the same as or, more preferably, greater than the volume of the second container. The overfilling of the second container with the aerogel particles is preferred because of the improvement in the insulating characteristics of the resulting insulation article. Thus, the unrestrained volume of the aerogel particles at the second air pressure preferably is about 10% or more (e.g., about 10–30%) greater than the volume of the first container. Such an overfilling of the second container can be accomplished by ensuring that the unrestrained volume of the aerogel particles at the second air pressure is larger than the volume of the second container and then ensuring that the actual volume of the aerogel particles at the first air pressure can be made small enough by a reduction in air pressure in the first container and optionally restraint on the volume of the aerogel particles (e.g., by the first container itself) so that the sealed first container comprising the aerogel particles can fit within the second container. The breaching of the sealed first container and the exposure of the aerogel particles therein to the second air pressure will cause the aerogel particles to expand and fill (desirably, overfill) the second container to its volume capacity.

The second container need not be sealed, but desirably is sealed to form the insulation article. In that respect, the second container can be sealed before, after, or while breaching the sealed first container. Since it is desirable to overfill the second container with the aerogel particles, the second container desirably is sealed before or while breaching the sealed first container.

The breaching of the sealed first container can be accomplished in any suitable manner. Suitable techniques for breaching the sealed first container include puncturing the sealed first container with a physical device and heating the sealed first container. The heating of the sealed first container to cause a breach is preferred, because such heating can take place while the sealed first container is present in a sealed second container (i.e., a second container that is sealed before the breaching of the sealed first container).

Heat can be applied to the sealed first container to cause a breach of that container by any suitable technique, e.g., sonic or microwave energy. Indeed, the manner in which the second container is sealed can be the same manner in which the sealed first container is breached. Thus, for example, if the second container is amenable to heat sealing, then the heat used to seal the second container can be used to breach the sealed first container, desirably in the same procedural step.

The first and second containers can comprise other things in addition to the aerogel particles. For example, the first and/or second containers can contain thermally reflective layers to improve the insulating characteristics of the resulting insulation article in certain applications. Similarly, the first and/or second containers can contain opaque materials, such as carbon black, to improve the insulating characteristics of the resulting insulation article in certain applications. The invention insulation article can have any suitable properties, e.g., thermal conductivity, light transmission, and handling characteristics. For example, the insulation article desirable has a thermal conductivity at 2.5° C. and/or 12.5° C. of about 20 mw/mk or less (e.g., about 19 mw/mk or less, or even about 18 mw/mk or less). Also, the insulation article desirable has a light transmission/cm thickness of the insulation article of about 50% or more (e.g., about 70% or more, or even about 80% or more). Other desirable characteristics of insulation articles are known to those of ordinary skill in the art, and the invention insulation article can be tailored to possess such desirable characteristics to fit particular end-uses for the insulation on article.

The following examples further illustrate the invention but, of course, should not be construed as in any way limiting its scope.

EXAMPLE 1

The example demonstrates the effect of reduced air pressure on the unrestrained volume of aerogel particles.

The of a sample of aerogel particles (particularly, silica aerogel particles) was measured at atmospheric pressure. This same sample of aerogel particles then was subjected to various reduced air pressures by placing the aerogel particles in a sealed (i.e., air-tight) container and imparting an increasing vacuum to the container. The volume of the aerogel particles was measured at these different reduced pressures and compared to the volume of the aerogel particles at atmospheric pressure. The percentage reduction in the measured volume of the aerogel particles at these different reduced pressures was calculated, and the resulting data is set forth in Table 1 below.

TABLE 1

Percentage Reduction in Volume as a Result of Pressure

| Air Pressure on Aerogel Particles (kPa) | Percentage Reduction in Volume of Aerogel Particles |
|---|---|
| 99 (atmospheric pressure) | — |
| 67 | 22.5% |
| 27 | 36% |
| 13 | 37% |
| 1 | 37% |
| 0 | 37% |

As demonstrated by the data set forth in Table 1, as the air pressure on the aerogel particles was reduced from atmospheric pressure, the unrestrained volume of the aerogel particles was significantly reduced. Specifically, the volume of the aerogel particles decreased (i.e., the aerogel particles contracted) by up to 37% in volume (volume=0.63×original volume at atmospheric pressure) as the air pressure exerted on the aerogel particles was reduced from atmospheric pressure (in this instance, about 99 kPa) to about 20 kPa and less. In addition, it was noted that when the different reduced air pressures subsequently were increased back to atmospheric pressure, the aerogel particles returned to their original volume at atmospheric pressure.

Thus, this example demonstrates that the volume of aerogel particles can be reduced by exposure to reduced air pressure. Furthermore, this reduction in aerogel particle volume is reversible with an increase in air pressure.

EXAMPLE 2

This example demonstrates the effect of aerogel packing on the insulation characteristics of the aerogel particles in an insulation article.

A container was filled with aerogel particles (particularly, silica aerogel particles) such that the unrestrained volume of aerogel particles was the same as the volume of the container, i.e., the aerogel particles did not overfill the container such that the container restrained the volume of the aerogel particles. An insulation article was thereby prepared, and the apparent thermal conductivity of the insulation article was measured at 2.5° C. and at 12.5° C. The container then was overfilled to different extents with aerogel particles, and the apparent thermal conductivity of each of the resulting insulation articles was measured at 2.5° C. and at 12.5°C. The results of these measurements are set forth in Table 2 below.

TABLE 2

Effect of Aerogel Packing on Article Thermal Conductivity

| Unrestrained Vol. % Aerogel Particles In Excess Of Container Volume | Apparent Thermal Conductivity (mw/mk) at 2.5° C. Mean Temperature | Apparent Thermal Conductivity (mw/mk) at 12.5° C. Mean Temperature |
| --- | --- | --- |
| 0 | 19 | 19.8 |
| 10 | 18.1 | 19 |
| 20 | 17.6 | 18.4 |
| 30 | 16.9 | 17.6 |
| 40 | 17 | 17.8 |

As demonstrated by the data set forth in Table 2, the container can be overfilled with aerogel particles so as to obtain an optimum thermal conductivity. In particular, when the unrestrained volume of the aerogel particles is about 10% or more, especially about 10–30%, of the volume of the container, the resulting insulation article achieves an optimum thermal conductivity at both 2.5° C. and 12.5° C.

This example demonstrates that aerogel particles provide an excellent insulation material. Furthermore, this example demonstrates that the unrestrained volume of aerogel particles relative to the volume of the container comprising the aerogel particles can be adjusted so as to provide optimum insulation characteristics for the resulting insulation article.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of preparing an insulation article comprising:
   (a) providing a sealed first container comprising aerogel particles under a first air pressure that is less than atmospheric pressure, wherein the unrestrained volume of the aerogel particles at the first air pressure is less than the unrestrained volume of the aerogel particles under a second air pressure that is greater than the first air pressure,
   (b) placing the sealed first container in a second container,
   (c) breaching the sealed first container to equalize the air pressure as between the first and second containers at the second air pressure and to increase the volume of the aerogel particles, thereby forming the insulation article.

2. The method of claim 1, wherein the second air pressure is less than atmospheric pressure.

3. The method of claim 1, wherein the second air pressure is atmospheric pressure.

4. The method of claim 3, wherein the unrestrained volume of the aerogel particles at the second air pressure is substantially the same as the volume of the second container.

5. The method of claim 1, wherein the unrestrained volume of the aerogel particles at the second air pressure is greater than the volume of the second container.

6. The method of claim 5, wherein the unrestrained volume of the aerogel particles at the second air pressure is about 10% or more greater than the volume of the second container.

7. The method of claim 6, wherein substantially all the aerogel particles have a diameter of about 0.5 mm or more.

8. The method of claim 7, wherein substantially all the aerogel particles have a diameter of about 5 mm or less.

9. The method of claim 8, wherein the aerogel particles are silica aerogel particles.

10. The method of claim 9, wherein the insulation article has a light transmission/cm thickness of about 80% or more.

11. The method of claim 1, wherein the method further comprises sealing the second container after breaching the sealed first container.

12. The method of claim 1, wherein the method further comprises sealing the second container before or while breaching the sealed first container.

13. The method of claim 1, wherein the sealed first container is breached by heating the sealed first container.

14. The method of claim 1, wherein the unrestricted volume of the aerogel particles at the second air pressure is greater than the volume of the second container, the second air pressure is atmospheric pressure, and the aerogel particles are silica aerogel particles of about 0.5 mm to about 5 mm diameter.

* * * * *